J. STEGER.
Car Starter.
No. 66,648.
Patented July 9, 1867.
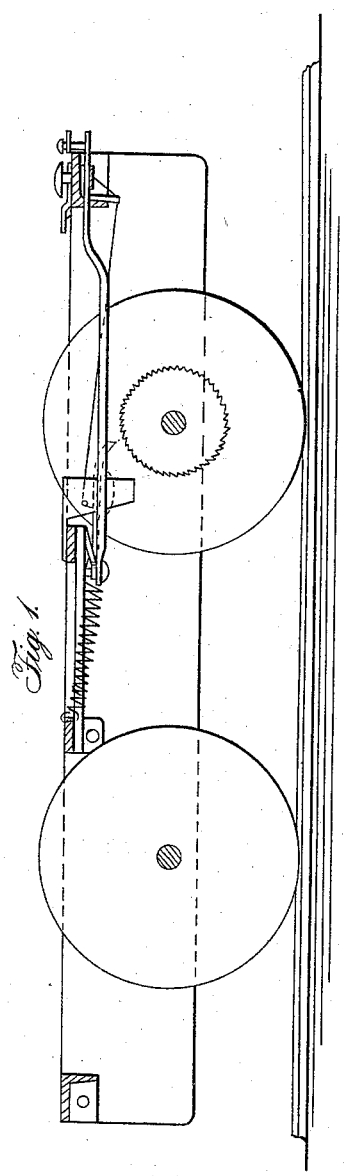
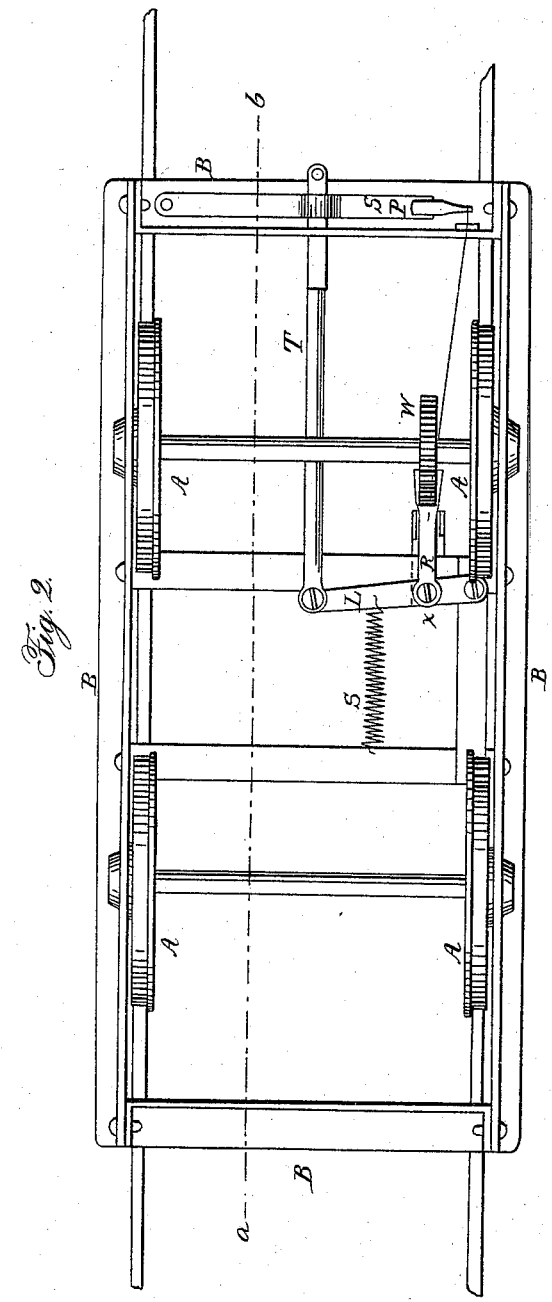
Witnesses:
Inventor:

United States Patent Office.

JOSEPH STEGER, OF NEW YORK, N. Y.

Letters Patent No. 66,648, dated July 9, 1867.

---

IMPROVED CAR-STARTING APPARATUS.

---

*The Schedule referred to in these Letters Patent and making part of the same.*

---

TO WHOM IT MAY CONCERN:

Be it known that I, JOSEPH STEGER, of the city, county, and State of New York, have invented a certain new and useful Means of Giving Motion to Railway Cars and other Vehicles; and I hereby declare that the following is a full and clear description thereof, reference being had to the accompanying drawings, which make part of this specification.

The object of my invention is to increase the traction force until the car acquires a given motion, and to this end I use a lever and ratchet-wheel, or other equivalent device, in combination with the wheels or other parts of the car which rest upon the track or roadway.

In the ordinary plan of applying traction force to a railroad car, both are made to move together with uniform speed. In my plan the traction force is so arranged as to move faster than the car until the *vis inertiæ* is overcome and the car acquires a given motion, upon which the speed of the traction force becomes uniform with that of the car. In the accompanying drawings—

Figure 1 represents a longitudinal vertical section of the apparatus as it would appear at the dotted line *a b*, and shows the operation of the ratchet and the platform spring.

Figure 2 represents an inverted plan of the same as applied to one end of the car only. A similar apparatus should be applied to each end.

A A A A represent the four wheels of a car as attached to two ordinary axles. B B B B represent the frame of the car. L is the lever, one end of which is attached to the framework of the car by a suitable pin or pivot, and the other end is connected with T, the traction-bar, and moves with it. R is the ratchet, connected with the lever at *x*, which is about one-third the distance from the pivot or fulcrum to the traction-bar, and is suspended in proper position by the spring P S in the platform of the car, from which it can be thrown, at the pleasure of the driver, upon W, the ratchet-wheel, which is fixed upon the axle. S is a spiral spring, so arranged as to press or draw back the traction-bar, lever, and ratchet, when the traction force is diminished below the pressure required to start the car.

When the car is stopped or to be started the driver, by his foot, presses down the platform spring, and allows the ratchet to fall upon its wheel. In this position it prevents the car from moving backwards, and when the traction force is applied to the lever the ratchet and wheel move the car forward with a force increased in proportion as the motion of the car is less than that of the traction-bar.

In the ordinary system of starting horse-cars, when held at rest by a brake upon an inclined plane, the removal of the brake allows the car to move backward, and the horses have to exert force enough to overcome the acquired momentum in addition to that which would otherwise be sufficient to start the car. By my invention the car is held at rest without the aid of the brake, and no motion nor momentum backward is acquired when the car is again to be started.

I do not confine myself to the mechanical arrangement herein described, as it may be varied by any practical mechanic without departing from the substantial originality of my invention, which consists chiefly in so arranging the traction force that its motion may be faster than that of the car, and its power be proportionately increased until the *vis inertiæ* of the car shall have been overcome.

What I claim as my invention, and desire to secure by Letters Patent, is—

1. The gearing device, consisting of the spring P S, provided with a foot-button, and the ratchet R suspended from said spring, substantially in the manner and for the purpose specified.

2. The car-starting device, consisting of the traction-bar T, lever L, pivoted ratchet R, ratchet-wheel W, spiral spring S, and spring P S, constructed and arranged substantially as herein specified.

JOSEPH STEGER.

Witnesses:
BENJ. TATHAM, Jr.,
R. P. BIXBY.